Nov. 20, 1928.
R. WEHR
VALVE CONSTRUCTION
Filed May 9, 1927
1,692,235
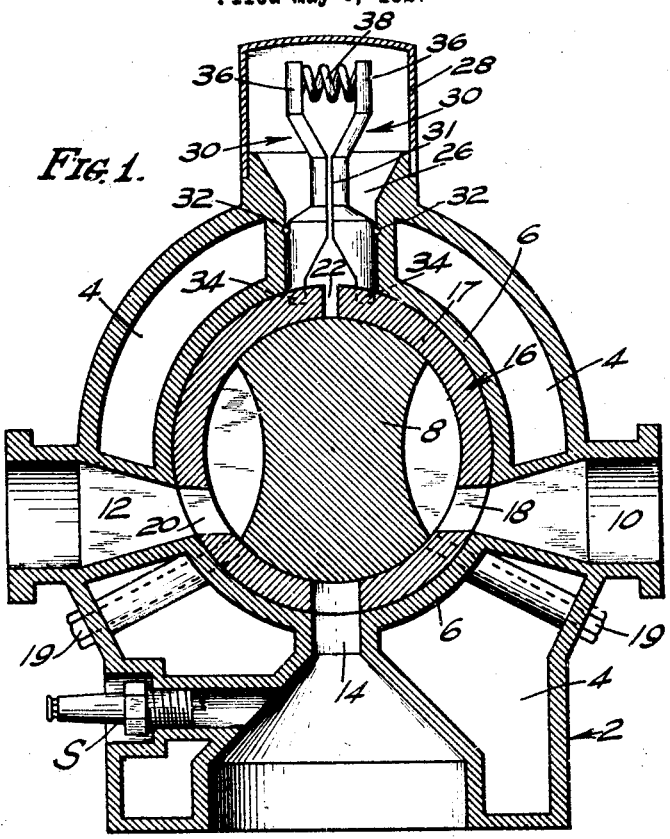
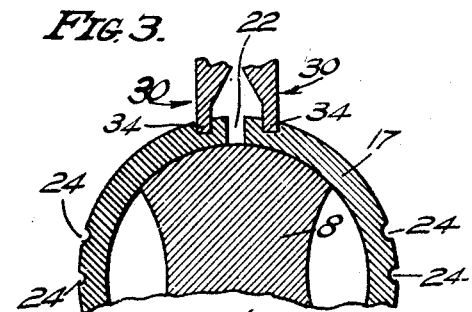
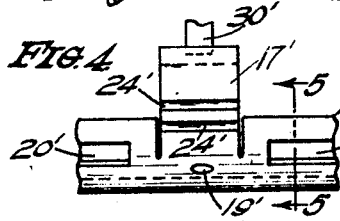
INVENTOR.
RUDOLPH WEHR
BY Fred N Hayne
ATTORNEY Patented Nov. 20, 1928.

1,692,235

UNITED STATES PATENT OFFICE.

RUDOLPH WEHR, OF LOS ANGELES, CALIFORNIA, ASSIGNOR TO WEHR MOTOR COMPANY, A CORPORATION OF CALIFORNIA.

VALVE CONSTRUCTION.

Application filed May 9, 1927. Serial No. 189,974.

My invention relates to valve constructions, and more particularly to such constructions in which means are provided for automatically compensating for the temperature and wear changes to which such constructions are subjected so that any leakage may be effectively prevented.

While my invention is more particularly designed and applicable to rotary valves associated with internal combustion engines, it will be clear that it is not to be limited to such, and is quite well adapted to different types of apparatus where other fluids are used, said invention being especially valuable and efficient when used in connection with apparatus where there are rapid pressure fluctuations as well as varying temperatures, said invention also providing a means for compensating for the wear to which the apparatus is subjected.

It accordingly is an object of my invention to provide a novel form of valve construction in which a valve, movable in its casing, is surrounded by a split valve liner or sleeve so constructed as to provide for an even compensating movement thereof when said construction is subjected to temperature changes and wear, said sleeve or liner having associated therewith a means for opposing the movement of said sleeve under the conditions mentioned so that all danger of leakage may be effectively prevented.

It is also within the province of my invention to equip my novel form of liner with a means whereby the expansion and contraction thereof, due to the temperature changes to which it is subjected, may be accomplished in an even manner, said means preferably taking the form of cut-away portions in the shape of depressions or grooves formed in the periphery of one or more sets of circumferentially cut portions integral with said liner at their lower ends, but free to move circumferentially, so that the entire liner will under all conditions maintain a tight fit with the valve therein and its casing, said depressions or grooves weakening said circumferentially cut portions for this purpose.

It is, moreover, within the province of my invention to cut away the entire upper half of the periphery of my novel liner or sleeve, leaving only the cut compensating portion or portions, said cut-away portions forming spaces for the reception of any carbon that may be formed, when my invention is applied to an internal combustion engine, the valve in its rotation effectively preventing said carbon from entering between the sleeve or liner and the valve casing, or between said valve and said liner or sleeve, it being thus impossible for any leakage of the construction between the ports, since said compensating portion or portions always maintain a tight fit between said valve, its liner and the valve casing.

The above and other objects of my invention as will hereinafter more fully appear, I attain by the apparatus constructed in accordance with the specification and illustrated in the drawings accompanying the same and forming a part of my application.

Reference is had to the accompanying drawings, in which similar reference characters denote similar parts. In the drawings, Fig. 1 is a transverse section through a cylinder head and valve of an internal combustion engine showing my invention applied thereto, Fig. 2 is a fragmentary side elevational view of Fig. 1 with outer casing or jacket removed to show how the compensating means is positioned between the cylinders, Fig. 3 is a transverse cross-sectional view on the line 3—3, Fig. 2, Fig. 4 is a view similar to Fig. 2 of a modification wherein the upper half of the periphery of the liner is cut away, leaving the compensating means, and Fig. 5 is a cross-sectional view taken on the line 5—5, Fig. 4.

Describing my invention more in detail, considerable difficulty is had in practice to provide an effective means for preventing leakage when a rotary valve is used, due to wear as well as the expansion and contraction resulting from rapid changes in pressure and varying temperatures, a valve clearance frequently resulting with deleterious results. By the use of my invention these difficulties are effectively overcome.

As seen in Fig. 1, my invention has been shown as applied to an internal combustion engine, but it will be distinctly understood that in its broader aspects said invention is not to be construed as limited to such engines.

In said figure the cylinder head 2 is provided with the usual water jacket 4 of any preferred construction, the valve casing 6 being shaped to house the rotary valve 8 of any desired configuration, said valve being cut away as shown so that the inlet passages 10 and the exhaust passages 12 may be alternately connected with the main cylinder ports 14, of the respective cylinders, a split liner or sleeve 16, hereinafter more particularly described, surrounding said valve and being equipped with an effective means for compensating for the temperature and wear changes to which said valve and liner or sleeve are subjected, and hence insuring that all leakage is eliminated.

In a cylinder block where a series of cylinders is employed, I preferably use one sleeve or liner 16 extending through the entire cylinder head, said cylinder head being provided with the usual bolts for detachably associating the same with the cylinders, which head may be made of standard size so as to fit without material change the engines now on the market.

The liner or sleeve, designated generally by the reference numeral 16, is preferably spit its entire length at the top as indicated at 22, to permit said liner or sleeve to creep toward and away from the valve 8 and the casing 6; and to compensate for the contraction and expansion of the valve 8 and said liner, so that a tight fit of the parts will at all times be maintained without leakage. I provide the compensating sleeve portion or portions 17, positioned between each cylinder. See more particularly Fig. 2.

The compensating portion or member 17 is preferably made integral with the sleeve or liner 16, said portion or member being formed by cutting said liner or sleeve, as shown in Fig. 2, any preferred number of longitudinal weakening depressions or grooves 24 being formed in said member, whereby the circumferential or peripheral movement of said sleeve or liner may be made in an even manner, so that the member 17 may accurately compensate for said movement in order that any valve leakage may effectively be prevented.

Preferably a set of additional anchoring bolts 19 (see Figs. 1 and 2) are provided below each member 17, which bolts take diagonally into the cylinder head 2 and valve casing 6, and into the liner 16.

As a means for resisting the movement of the sleeve 16 under wear conditions or changes in temperature, I provide the complementary devices or members 30, which are preferably formed identical in shape, being rounded externally, and of flattened and tapered form on their inner sides, the flattened vertical portions 31 forming pivotal bearing surfaces as the extensions 34, detachably positioned in appropriate grooves or cut away portions in the member 17, are moved by the action of said member a resilient means in the shape of a helical spring 38 of suitable strength, and positioned between the upper extension 36 of said devices, at all times opposing said movement.

The upper part of the cylinder head 2, preferably positioned between each cylinder and above the member 17, is provided with a housing 26 of any desired form to house the devices 30, a dust cap 28 being detachably associated with said housing, which housing is preferably flared outwardly to permit ample movement of said devices. Any suitable means for preventing the accidental removal of the spring 38, such as a conventional pin and cap construction, may be provided, and to insure that said devices shall not get out of alignment, a conventional circular spring means 32 may be provided to prevent displacement of said devices, although said spring may be omitted.

The spring means 32 is nothing more than an open-ended circular spring member, such as used, for example, for holding the lens of an automobile lamp in position, and being of conventional form, further illustration and description are deemed unnecessary.

The cylinder head casting 2 is provided with the usual inlet ports 10, connecting with the inlet manifold of the engine, which ports are in alignment with the liner ports 18, and similarly exhaust ports 12, connected to the exhaust manifold, are adapted to align with the exhaust ports 20 of said liner, the cut away portions of the valve 8 being adapted periodically to connect said ports with the cylinder inlet ports 14, a spark plug S being provided for firing the compressed gaseous mixture.

As the liner 16 is expanded by the heat of the exploded gases, the space 22 will permit the upper portions of said liner to come together, since said portions are free to move, the lower portion being anchored by the bolts 19. The compensating member 17, being also free to move, will expand with said liner, causing the projections 34 to move toward each other, the upper extensions 36 of the devices 30 moving outwardly under the action of the spring 38, the weakening grooves or depressions 24, permitting an even movement of the compensating member 17, and hence that of the liner 16. A contraction of the liner 16 will cause the lower extensions 34 to move outwardly, the upper extensions 36 moving toward each other and compressing the spring 38. It will thus be seen that any movement of the liner 16, due to wear or expansion and contraction will be accurately and automatically compensated for, the parts at all times maintaining a close fit, this making any leakage between the ports impossible.

In Figs. 4 and 5 I have shown a modification of my invention in which the upper half of the liner 16' is cut away to form a space for any accumulation of carbon, and to insure that none will form between the inlet and exhaust ports, the valve 8 effectively cutting away such carbon as it is rotated.

As in the other form of my invention, the compensating device 17', with its weakening grooves or depressions 24', is equipped with the devices 30', and inlet and exhaust ports 18' and 20', the operation of the parts being precisely the same, one of said compensating devices being positioned between each cylinder, diagonal anchoring bolts 19' being also provided as in the other form of my invention.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. In a valve construction, in combination, a valve casing, an integral liner in said casing, a valve adapted to be rotated in said liner, and a peripherally movable compensating device integral with said liner, and embracing substantially the entire periphery of said valve, for compensating for the effect of the temperature changes and wear to which said valve construction is subjected.

2. In a valve construction, in combination, a casing, a split liner in said casing, a rotary valve in said liner, and a compensating member integral with said liner, and cut therefrom, said liner being adapted to have a circumferential creeping movement with respect to said casing whereby the effect of all temperature changes and wear to which said valve construction may be subjected will be compensated for.

3. In a valve construction, in combination, a casing, a rotary valve therein, an integral split liner in said casing surrounding a substantial portion of said valve, said liner being adapted to have an even circumferential movement with respect to said casing and said valve, and means associated with said liner for resisting said movement.

4. In a valve construction, in combination, a valve casing, a rotary valve in said casing, a perforated split temperature and wear compensating sleeve positioned between said valve and said casing, and a pair of spring actuated devices for resisting the movement of said sleeve, said sleeve being provided with means whereby an even pressure of said sleeve against said casing will be insured.

5. In a valve construction, in combination, a casing, a valve adapted to be actuated in said casing, a circumferentially movable split sleeve surrounding said valve, and a pair of complementary spring actuated devices for resisting the movement of said sleeve, the inner end of each of said devices being positioned in grooves juxtaposed to the split portion of said sleeve.

6. In combination, a valve casing, a valve adapted to be actuated in said casing, a split compensating sleeve of unvarying cross-section surrounding said valve, and sets of members cut from said sleeve but integral therewith on one end for varying the clearance between said valve and casing as said casing and valve are subjected to temperature and wear changes, whereby all leakage between said valve and said casing may effectively be prevented.

7. In combination a valve casing, a valve adapted to be actuated in said casing, a split compensating sleeve surrounding said valve, means for varying the clearance between said valve and casing as said valve and casing are subjected to temperature changes and wear, a pair of vertically positioned devices associated with said sleeve for compensating for the temperature and wear changes to which said valve and casing are subjected, and means associated with said devices for opposing the movement of said sleeve.

8. In combination, a valve casing, a valve adapted to be rotated in said casing, a perforated sleeve surrounding said valve, a pair of oscillating devices associated with said sleeve for opposing its movement when said valve and casing are subjected to temperature changes and wear, and resilient means associated with said devices for yieldingly opposing their movement.

9. A valve liner adapted for use in connection with a valve construction, comprising a cylindrical member, a set of temperature and wear compensating elements connected with said member, a pair of complementary devices associated with each of said compensating elements, said devices each having at one end a projection for detachably engaging said member, and yieldable means positioned between the other ends of said devices for opposing any movement of said compensating elements.

10. A valve liner adapted for use in connection with a valve construction comprising a cylindrical member equipped with ports adapted to align with the ports of the valve casing with which said liner is adapted to be associated, said member having its upper portion cut away to provide spaces when associated with said casing, and one or more wear and temperature compensating means associated with said member; said means comprising one or more parts split from said liner, but integral therewith on one end.

11. Temperature and wear devices adapted for special use in connection with the liner of a valve construction comprising a pair of complementary members adapted to be detachably associated with said liner, each of said members being equipped with coacting bearings surfaces, a lower extension on each of said devices adapted to take into depressions in said liner, an upper extension on each of said devices, and a resilient means positioned between said upper extensions, said means being adapted to resist the outward movement of said lower extensions.

In testimony whereof I have signed my name to this specification.

RUDOLPH WEHR.